UNITED STATES PATENT OFFICE.

JAMES W. GEDDES, OF BALTIMORE, MARYLAND, ASSIGNOR OF TWO-THIRDS TO HARRISON HOPPER AND JOHN R. WRIGHT, BOTH OF SAME PLACE.

METHOD OF RESTORING OLD METAL CANS.

SPECIFICATION forming part of Letters Patent No. 387,587, dated August 7, 1888.

Application filed December 30, 1887. Serial No. 259,432. (No specimens.)

*To all whom it may concern:*

Be it known that I, JAMES W. GEDDES, a citizen of the United States, residing at the city of Baltimore, in the State of Maryland, have invented certain new and useful Improvements in the Method of Restoring Old Metal Cans for Repacking and Resealing, of which the following is a specification.

The packing sealed metal can of trade is made by first soldering the cylindrical body-seam and then soldering on the top, which has been previously punched with the cap-opening through which the can is filled. This soldering of the top must be done on the inner side of the can, in order to give the proper security and tightness. This interior soldering can only be done before the bottom of the can is put on, and the top must be first put on and secured before the bottom is put on, in order to permit the bottom to be also soldered on from the inner side through the hole in the top through which the can is filled. The exterior soldering of the top and bottom is then done, and the cans are filled and sealed. When the filled cans are used by the consumer, their tops are generally cut and mutilated to empty the contents, and the can thrown away as a useless thing for repacking, because hitherto, so far as I know and can find, no means have been devised whereby the old top can be replaced by a new top soldered on from the inner side, while the other end or bottom remains closed.

The object of my improvement is to restore these thrown-away cans, properly cleansed, to their original condition for repacking in the trade with a top and bottom soldered from the inner side as when new. This I do by a method which I have devised, and which I will describe.

I take the once-used, mutilated, or thrown-away can and first remove the old top by unsoldering it and throwing it away, leaving the body and bottom of the can intact. I then cleanse it by washing or otherwise. Then, instead of punching and making a new top from new metal, I place the old can, with its bottom intact, over and upon a suitable die, and punch a cap or filling-opening in the bottom, thus making it the top where before it was the bottom of the can. Thus it will be seen that this new top is already soldered on the inner side; and now it will further be seen that I am enabled to put on a new bottom, also soldered from the inner side by means of access afforded by the hole made in the bottom, which has now become the top by the punching, as before stated. Now, this new bottom is put on just the same, and soldered from the inner side in the same manner as when the can was first made. Thus it will be seen that I have restored or reconstructed an old can with its bottom and top soldered upon the inner side just as secure and tight as when made and in a perfectly clean condition.

This method of reconstructing the can while the top is off permits it to be thoroughly cleansed of all residuum of its former contents, buffed and polished until clean as new; and this method of allowing old cans to be cleaned and the top and bottom soldered on the inner side is an important matter of my improvement, since they cannot be properly cleansed without removing the top.

I claim—

The method substantially herein described of restoring old used metal cans for repacking, which consists in removing the old tops, then cleansing the cans, then converting the bottom into a top by dieing or punching out the cap or filling-opening, and then placing a new bottom on the body of the can and soldering it from the inner side by access afforded through the died or punched-out cap-opening.

In testimony whereof I affix my signature in presence of two witnesses.

JAMES W. GEDDES.

Witnesses:
JOHN R. WRIGHT,
C. H. SLICER.